United States Patent [19]

Wilkey

[11] Patent Number: 4,825,713
[45] Date of Patent: May 2, 1989

[54] MONOLITHIC SUSPENSION ASSEMBLY USING CROSS FLEXURE PIVOTS

[75] Inventor: William P. Wilkey, Phoenix, Ariz.

[73] Assignee: Honeywell, Inc., Minneapolis, Minn.

[21] Appl. No.: 102,702

[22] Filed: Sep. 30, 1987

[51] Int. Cl.⁴ .............................................. G01C 19/22
[52] U.S. Cl. ...................................................... 74/5 F
[58] Field of Search .......................... 74/5 F; 464/100; 29/434

[56] References Cited

U.S. PATENT DOCUMENTS

| | | |
|---|---|---|
| Re. 30,290 | 6/1980 | Craig et al. ........................ 74/5 F X |
| 3,586,866 | 6/1971 | Ensinger ................................ 74/5 F |
| 3,700,289 | 10/1972 | Bilinski et al. ..................... 74/5 F X |
| 3,700,290 | 10/1972 | Ensinger ............................ 74/5 F X |
| 3,856,366 | 12/1974 | Weisbord et al. ................. 74/5 F X |
| 4,143,451 | 3/1979 | Craig et al. ........................ 74/5 F X |
| 4,665,605 | 5/1987 | Kempas ............................. 74/5 F X |

Primary Examiner—Rodney H. Bonck
Attorney, Agent, or Firm—Howard Paul Terry

[57] ABSTRACT

A two axis, monolithic suspension assembly for a gyroscope using cross flexure pivots and having an integral driving element which is rotatable about an axis of rotation, wherein the driving element is connected to a driven element by a suspension means, which comprises an upper gimbal, an intermediate gimbal and a lower gimbal. The lower gimbal is fixedly connected to the driving element and the upper gimbal is fixedly connected to the driven element. Each of the upper gimbal and lower gimbal have two cross flexure pivots, which connect to the intermediate gimbal. The cross flexure pivot consists of two diagonal flexure strips which represent an increase in the radial stiffness and a reduction in the radial compliance, from those required in prior art devices. A method for fabricating such a suspension in one piece without the need for any flexure strip separating operations, wherein the integral cross flexure pivots are provided by forming pairs of adjacent bores in a blank and wherein the upper gimbal, intermediate gimbal and lower gimbal are formed by traveling wire electrical discharge machine techniques. Errors which would arise due to changes in both the angular compliance and location of the pivot axes are minimized by proper selection of the cross flexure pivot geometry.

2 Claims, 4 Drawing Sheets

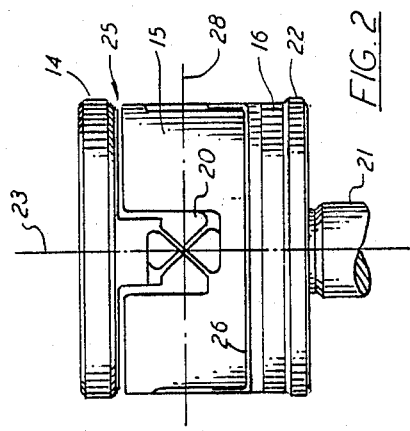
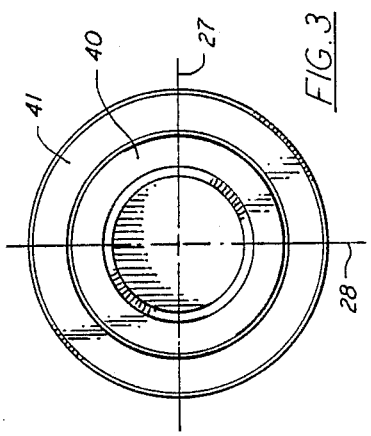
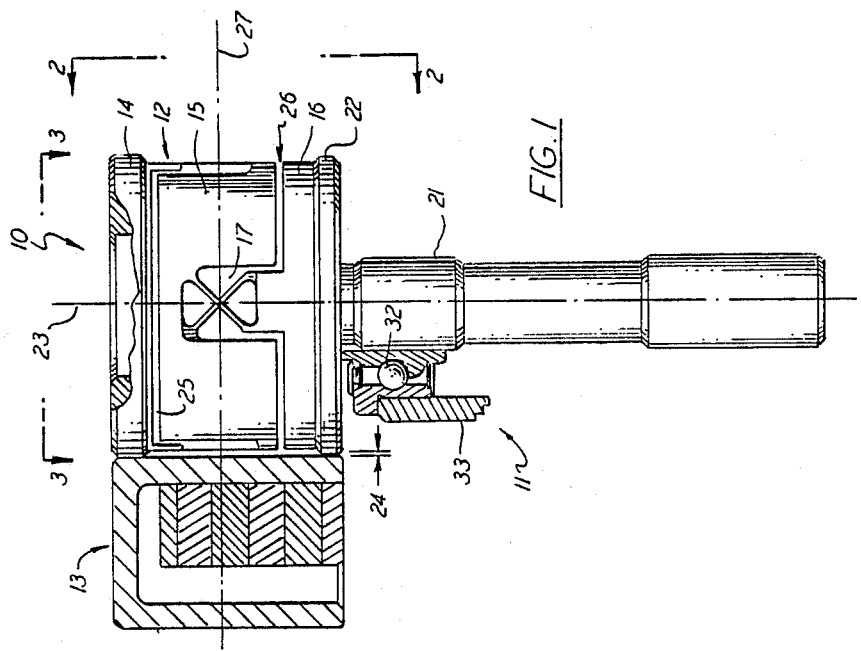

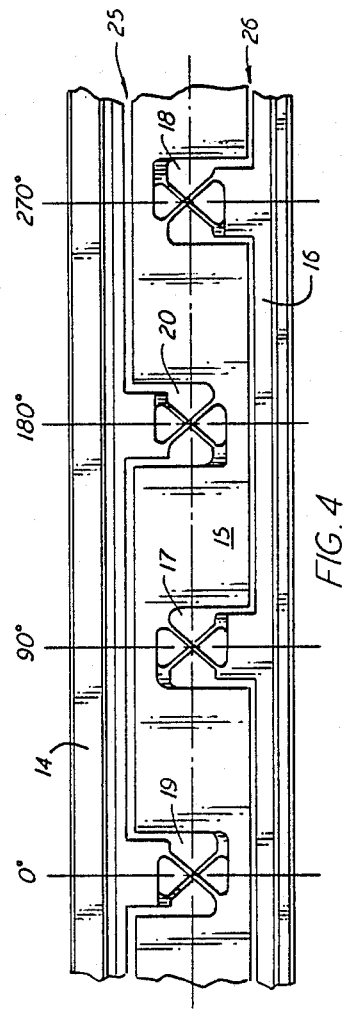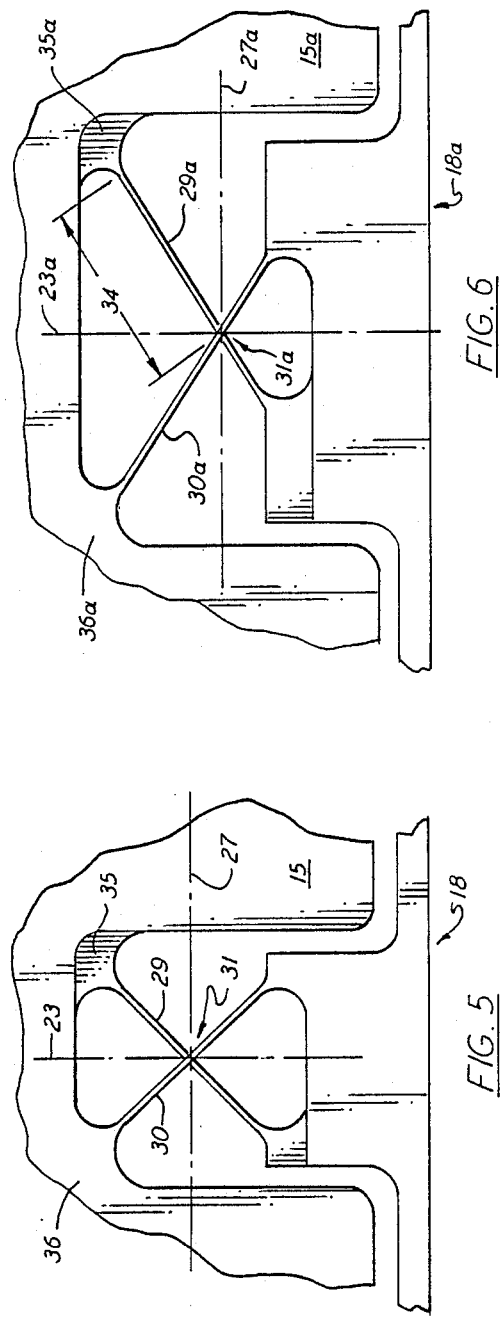

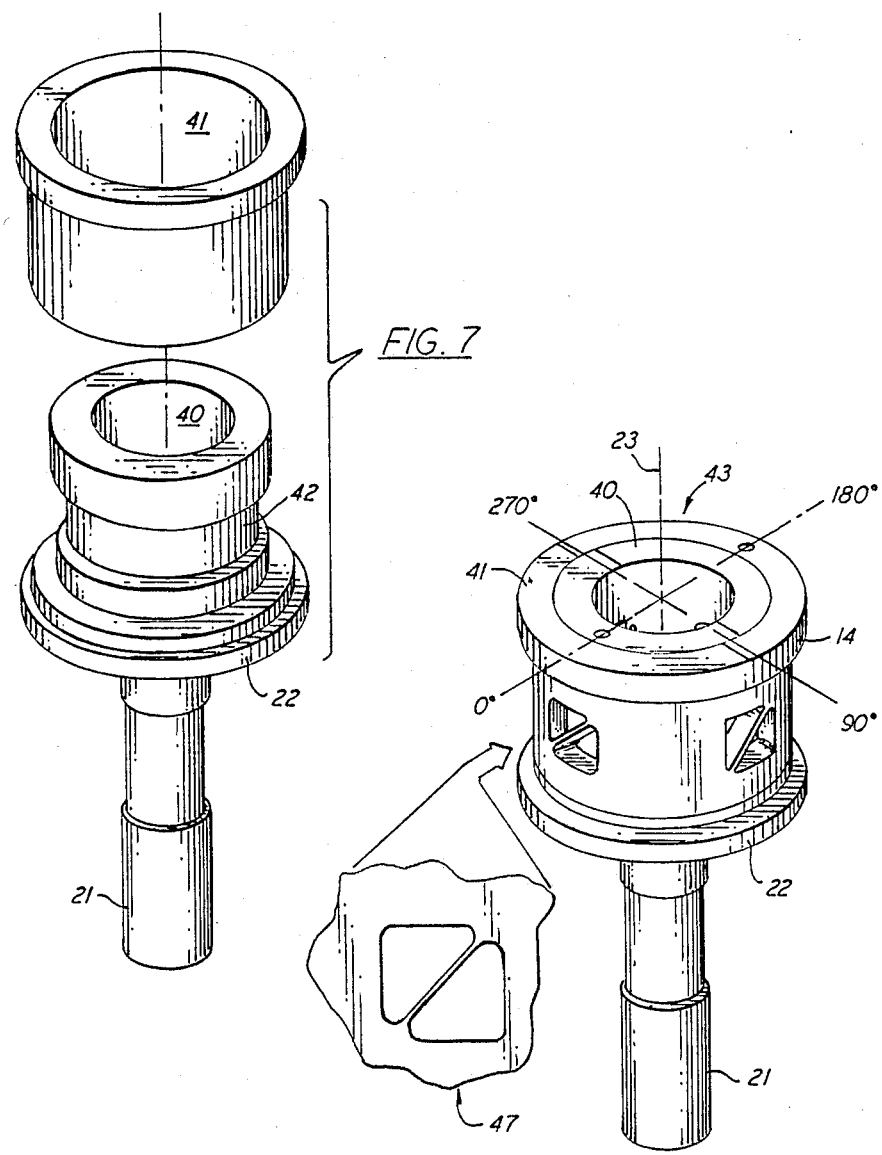

४,८२५,७१३

MONOLITHIC SUSPENSION ASSEMBLY USING CROSS FLEXURE PIVOTS

This invention relates to a monolithic suspension assembly, and particularly to a gyro monolithic suspension assembly having diagonal cross flexure pivots with radially offset diagonal strips.

BACKGROUND OF THE INVENTION

The prior art gyro suspension assembly is described in U.S. Pat. No. 4,270,392, by W. J. Krupick.

One problem with the prior art gyro suspension assembly is that the flexure webs provide relatively high axial stiffness along the spin axis of the rotor and relatively low stiffness in the radial direction, that is in a radial direction along an axis perpendicular to the spin axis of the rotor. Such construction of the flexure webs produces relatively large drift errors, whenever the gyro is subjected to simultaneously applied acceleration forces in both the axial and radial directions.

Further, the manufacture of the prior art gyro suspension assembly is relatively difficult, because of a deformation of the flexure web during the manufacture thereof.

SUMMARY OF THE INVENTION

According to the present invention, a two axis, gyro monolithic suspension assembly having cross flexure pivots is provided, which has relatively less axial stiffness along the spin axis and relatively more radial stiffness in a radial direction than the prior art suspension assembly, because of the use of cross flexure pivots with radially offset diagonal strips.

Further, the manufacture of the suspension assembly according to the invention is less difficult than the manufacture of the prior art suspension assembly; and has substantially less deformation of the flexure webs during the manufacture thereof.

BRIEF DESCRIPTION OF THE DRAWINGS

In the drawings, preferred embodiments of the invention are illustrated.

FIG. 1 is a partial, vertical cross-section view of a two degree-of-freedom gyro according to the invention;

FIG. 2 is a view as taken along section 2—2 of FIG. 1;

FIG. 3 is a view as taken along section 3—3 of FIG. 1;

FIG. 4 a developed exterior view of a suspension assembly;

FIG. 5 is a detailed front view of a flexure element;

FIG. 6 is an alternate detailed front view of a flexure element;

FIG. 7 is an exploded elevation view showing inner and outer annuluses at a first stage of manufacture of the suspension assembly;

FIG. 8 is an elevation view at a second stage of manufacture of the suspension assembly;

DESCRIPTION OF THE PREFERRED EMBODIMENT

Figure 10:
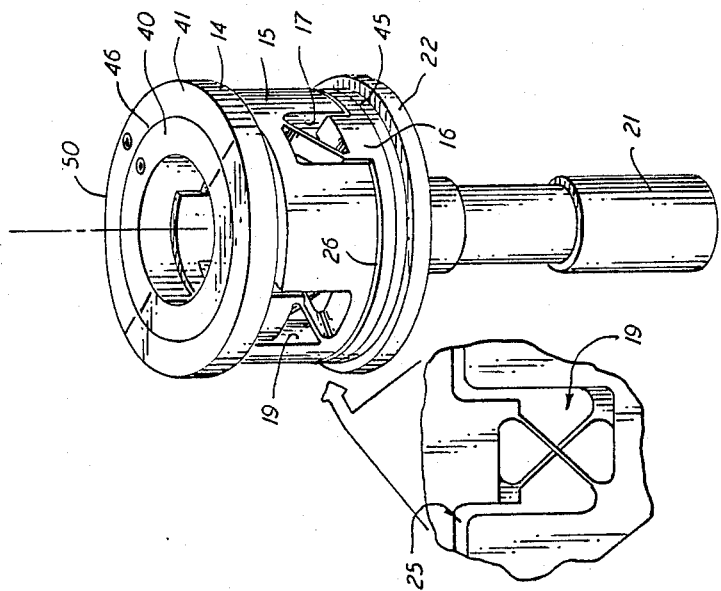
FIG. 10 is an elevation view at a fourth stage of manufacture of the suspension assembly.

In FIG. 1, a gyroscope 10 according to the invention is shown. Gyroscope 10 includes a drive means 11, a suspension means 12, and a rotor means 13.

Suspension means 12 includes an upper gimbal 14, which supports rotor means 13, an intermediate gimbal 15, and a lower gimbal 16, which is supported by drive means 11. Intermediate gimbal 15 is connected to lower gimbal 16 by a pair of cross flexure pivots 17, 18. Intermediate gimbal 15 is connected to upper gimbal 14 by a pair of cross flexure pivots 19, 20.

Drive means 11 includes a drive shaft 21, which has a flange portion 22. Drive shaft 21 spins about a spin axis 23.

A stop gap 24 of selected thickness is provided between flange portion 22 and rotor means 13, so that the maximum angle of tilt of rotor means 13 relative to spin axis 23 is limited.

Suspension means 12 has an upper annular slot 25 extending between intermediate gimbal 15 and upper gimbal 14. Suspension means 12 also has a lower annular slot 26 extending between intermediate gimbal 15 and lower gimbal 16.

In FIGS. 1, 2 and 3, the views of axes 23, 27 and 28 are projected views for ease of illustration.

Slot 26 extends in a peripheral direction between cross flexure pivots 17 and 18. Slot 25 extends in a peripheral direction between cross flexure pivots 19 and 20.

In FIG. 5, an enlarged view of typical pivot 18 is shown. Pivot 18 includes an inner strip 29 and an outer strip 30. Strips 29, 30, which are diagonal strips, are radially offset along axis 28. Strips 29, 30 have a common axis with a crossing point 31, which is located at strip mid-span, and which substantially coincides with axis 28. In FIG. 5, the views of axes 23, 27 are projected views, for ease of illustration.

In FIG. 6, an alternate design of pivot 18 is shown. Parts of alternate pivot 18a, which are like parts of pivot 18, have the same numerals, but with a subscript "a" added thereto. Pivot 18a includes an inner strip 29a and an outer strip 30a. The views of axes 23a, 27a are projected views for ease of illustration. Strips 29a, 30a have a common axis and crossing point 31a, which is not located at strip mid-span, but which does substantially coincide with axis 28a. Strip 29a has its crossing point 31a located along its span at a length 34, which is a preselected length, as explained hereafter in the specification.

Drive means 11 includes a motor stator portion 33 and a bearing unit 32 for rotation of drive shaft 21 relative to stator portion 33.

In FIG. 5, intermediate gimbal 15 has an inner gimbal portion 35, which is fixedly connected to inner strip 29, and has an outer gimbal portion 36, which is fixedly connected to outer strip 30.

In FIG. 6, intermediate gimbal 15a also has an inner gimbal portion 35a, which is fixedly connected to inner strip 29a, and has an outer gimbal portion 36a, which is fixedly connected to outer strip 30a.

Referring to FIGS. 7, 8, 9 and 10, a method of manufacture of suspension means 12 will be described. As seen in FIG. 7, the method of manufacture utilizes an inner annulus member 40 and a second outer annulus member 41. Each member is formed of a material having suitable mechanical characteristics such as high yield strength alloy steel. The inner annulus member 40 and the outer annulus member 41 are fabricated by conventional machining methods and coded for precision matching. The inner annulus member 40 has an annular recess 42 so as to facilitate the flexure strip separation without the need for any additional machining operation later. Shaft 21 is integral to the inner annulus member 40 which thereby provides a superior alignment between shaft 21 and suspension means 12. Such alignment represents an improvement over the prior art method of attaching the shaft separately.

In FIG. 8, the next step in he method of fabricating suspension means 12, is the joining together in concentric relationship of the annular members 40 and 41. The construction allows 4 flexure strips of both annular members to be machined simultaneously by in-line traveling wire electrical discharge machine techniques to form configuration 47 as shown in FIG. 8. To accomplish this, the outer annulus 41 is temporarily staked to the inner annulus member 40 and held rigidly in place to assure symmetry and uniformity of the flexure profile and pivot axis position. The entire assembly 43 is then rotated 90° in the same workpiece setting and the second set of 4 flexure strips is formed to complete step two of FIG. 8.

Figure 9:
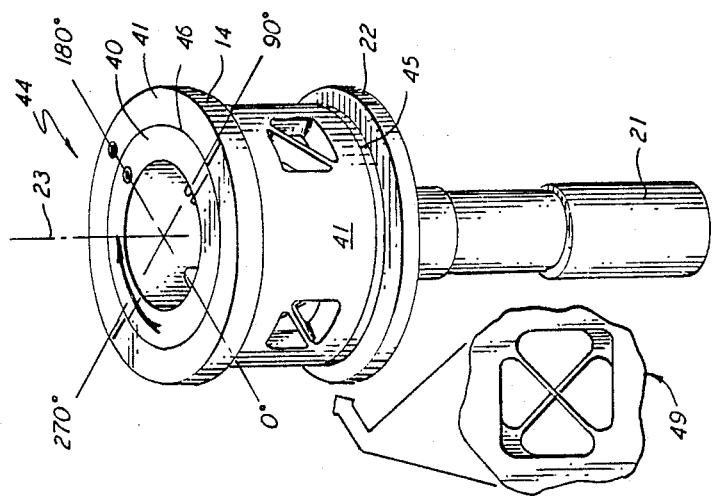
FIG. 9 is an elevation view at a third stage of manufacture of the suspension assembly.

In FIG. 9, in the next step, the temporary staking is removed; and outer annulus member 41 is rotated 180° with respect to the inner annulus member 40 to form the cross flexure configuration 49. At this point the suspension assembly is electron beam welded along seams 45 and 46 to form a monolithic annular member 44.

In FIG. 10, the monolithic annular member 44 which results from the joining operation is then separated into the separate flexure joints and other component parts of the flexure suspension assembly of the invention. The separation operation is carried out by the traveling wire electrical discharge machine (EDM) technique because of the nature of the cuts 25 and 26 which must be made in the monolithic annular member 44. However, the terms "separation" or "separating" as used herein shall be deemed to include not only EDM but also other types of cutting or machining operations which are capable of producing the component parts of the assembly shown herein. The separation operation completes the first stage of fabrication and divides the monolithic annular member 44 into three basic constituent parts comprising an intermediate gimbal 15, a lower gimbal 16 with a flange portion 22, and a gimbal and rotor support ring 14. The suspension assembly 12 is complete at this stage and is ready to be calibrated and installed into a gyro 10. Dynamic balancing relative to the bearing 32 can be accomplished by laser trimming the rotor assembly 13.

The operation of the suspension assembly 12 is similar to the operation of the two axis flexure assembly described in U.S. Pat. No. 3,354,726 for tuned rotor gyros. When a gyro rotor 13 is spun at high speed N about the shaft axis 23 it attains angular momentum and resists changes in attitude. In the presence of an angular deflection of the rotor 13 relative to the shaft 21, a positive torque acts upon the rotor 13 due to bending of the cross flexure pivots 17, 18, 19, 20. A compensating negative torque is inherently developed, however, due to the constrained motion of the gimbal. When the rotor 13 is operated at the proper speed (i.e. the tuned speed) the dynamically induced negative torque is made exactly equal in magnitude and opposite in direction to the physically induced positive torque associated with bending of the cross flexure pivots 17, 18, 19, 20. For this condition, the resultant torque coupling the rotor 13 to the shaft 21 is zero. An equivalent statement is that the direct angular spring rate $K_D$ is zero. This tuned speed $N_o$ corresponds to $$N_o = \sqrt{\frac{K_T}{A + B - C}}$$

where $N_o$ = Tuned speed (radians/second).
$K_T$ = Algebraic sum of the angular spring rates of all flexures (dyne-cm/radian). (17, 18, 19, 20)
A, B, C = Moments of inertia of the intermediate gimbal (15) about the x, y, z axes respectively (gram. cm$^2$).

The advantage of the cross flexure pivot configuration according to the invention resides in the fact that the axes of articulation x and y may be made to lie on the crossing point 31 of the flexures, even when displaced by their deflection, i.e., this axis lies at a point which remains in the same position relative to both of the two bodies 16 and 15. In addition, the crossing point 31 at length 34 of the separated cross flexure pivot strips in FIG. 6 may be so designed as to simultaneously render it insensitive to changes in angular compliance due to applied loads and maintain the spatial position of the pivot axes during angular displacement of the suspension assembly. This crossing point 31 of the strips in FIG. 6 occurs at 87.3% ($=\frac{1}{2}+\sqrt{5}/6$) of the distance along the span of each strip and appears to be superior in all respects for applications demanding higher mechanical accuracy. Cross flexure pivots and their characteristics are described in an article entitled "The Properties Of Crossed Flexure Pivots And The Influence Of The Point At Which The Strips Cross" by W. H. Wittrick which was published in the Aeronautical Quarterly, Vol. II, February 1951, pages 272 through 292. The flexure hinges 17, 18, 19, 20 taught herein are integral with gimbal elements 14, 15, 16, and the driving element 21. Thus, by crossing the strips in the aforementioned manner the center of rotation remains fixed to a high order of accuracy. As a direct result of this, the rotational stiffness remains sensibly constant over an appreciable range of vertical force.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of the invention in which an exclusive property or right is claimed are defined as follows:

1. A gyroscope including,
    a drive means having a spin axis,
    a suspension means, and
    a rotor means, wherein
    said suspension means comprises;
    a lower gimbal supported by drive means;
    an upper gimbal supporting the rotor means; and
    an intermediate gimbal having first and second cross flexure pivots, each pivot having a radially inner diagonal strip and a radially outer diagonal strip connecting to the upper gimbal, said inner and outer strips having a common flexure axis disposed along a first pivot axis which is normal to the spin axis;

said intermediate gimbal having third and fourth cross flexure pivots, each said pivot having a radially inner diagonal strip and a radially outer diagonal strip connecting to the lower gimbal, said inner and outer strips having a common flexure axis disposed along a second pivot axis which is in quadrature with said first gimbal axis and said spin axis; wherein said intermediate gimbal has a radially inner portion connecting to said inner strips;

said intermediate gimbal has a radially outer portion connecting to said outer strips; and said radially inner portion is radially offset from said radially outer portion; and wherein said inner and outer diagonal strips of each of said flexure pivots have a crossing point at an end view of its flexure axis;

said crossing point is located at a preselected point along the span of each of said diagonal strips; and said preselected point along the span of each said diagonal strip is located at a length approximately equal to 87.3 percent of the span length of the diagonal strip from one end thereof.

2. A suspension assembly comprising:
a lower gimbal having a spin axis;
an upper gimbal; and
an intermediate gimbal having first and second pivot axes disposed in quadrature with the spin axis;

said intermediate gimbal having first and second cross flexure pivots, each said pivot having a radially inner diagonal strip and a radially outer diagonal strip connecting to the upper gimbal, said inner and outer diagonal strips having a common flexure axis disposed along the first pivot axis; and said intermediate gimbal having third and fourth cross flexure pivots, each said pivot having a radially inner diagonal strip and a radially outer diagonal strip connecting to the lower gimbal, said inner and outer diagonal strips having a common flexure axis disposed along the second pivot axis, wherein said intermediate gimbal has a radially inner portion connecting to said inner strips;

said intermediate gimbal has a radially outer portion connecting to said outer strips; and said radially inner portion is radially offset from said radially outer portion; and wherein said inner and outer diagonal strips of each of said flexure pivots have a crossing point at an end view of its flexure axis;

said crossing point is located at a preselected point along the span of each of said diagonal strips; and said preselected point along the span of each said diagonal strip is located at a length approximately equal to 87.3 percent of the span length of the diagonal strip from one end thereof.

* * * * *